United States Patent
Shiiyama

(10) Patent No.: US 8,965,133 B2
(45) Date of Patent: Feb. 24, 2015

(54) IMAGE PROCESSING APPARATUS AND CONTROL METHOD THEREFOR

(71) Applicant: Canon Kabushiki Kaisha, Tokyo (JP)

(72) Inventor: Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 13/646,265

(22) Filed: Oct. 5, 2012

(65) Prior Publication Data

US 2013/0108176 A1 May 2, 2013

(30) Foreign Application Priority Data

Oct. 28, 2011 (JP) .................. 2011-237962

(51) Int. Cl.
*G06K 9/46* (2006.01)
*G06K 9/62* (2006.01)

(52) U.S. Cl.
CPC .............. *G06K 9/623* (2013.01); *G06K 9/4671* (2013.01)
USPC ........... 382/201; 382/195; 382/190; 382/100; 382/305

(58) Field of Classification Search
CPC .............. G06K 9/18; G06K 9/46; G06K 9/48; G06T 2207/10016; G06T 7/0081; G06T 5/001; G06F 17/30265; G06F 17/30247
USPC .......................... 382/201, 190, 195, 100, 305
See application file for complete search history.

(56) References Cited

U.S. PATENT DOCUMENTS

| | | | |
|---|---|---|---|
| 5,905,811 A | 5/1999 | Shiiyama et al. | |
| 7,418,135 B2 | 8/2008 | Shiiyama | |
| 8,280,196 B2 | 10/2012 | Magai et al. | |
| 2008/0285855 A1* | 11/2008 | Shiiyama et al. | 382/190 |
| 2010/0296736 A1 | 11/2010 | Shiiyama et al. | |
| 2010/0299355 A1 | 11/2010 | Shiiyama et al. | |
| 2011/0103697 A1 | 5/2011 | Magai et al. | |
| 2011/0170780 A1* | 7/2011 | Vaddadi et al. | 382/190 |

FOREIGN PATENT DOCUMENTS

JP 2011-043969 A 3/2011

OTHER PUBLICATIONS

David G. Lowe, "Distinctive Image Features from Scale-Invariant Keypoints", International Journal of Computer Vision, vol. 60, 2, pp. 91-110, 2004.
C. Harris, et al. "A Combined Corner and Edge Detector", Alvey Vision Conference, pp. 147-152, 1988.
J.J. Koenderink, et al., "Representation of Local Geometry in the Visual System", Biological Cybernetics, vol. 55, pp. 367-375, 1987.

* cited by examiner

*Primary Examiner* — Ruiping Li
(74) *Attorney, Agent, or Firm* — Fitzpatrick, Cella, Harper & Scinto

(57) ABSTRACT

An image processing apparatus to obtain highly reliable local feature point and local feature amount. With the number of local feature points as a factor of an image local feature amount description size, the reproducibility of the local feature point and local feature amount is estimated, and description is made by the local amount description size, sequentially from local feature point and local feature amount with the highest reproducibility. It is possible to ensure a local feature amount description size and search accuracy.

16 Claims, 10 Drawing Sheets

DESCRIPTION TARGET
NUMBER OF LOCAL FEATURE POINTS n = 1  NO FEATURE POINT    0 n = 2                      $A = (1-r)S/(1-r^n)$ n = 3                      $rA$ n = 4                      $r^2 A$

⋮ n = N-1                    $r^{(N-2)}A$ n = N  NO FEATURE POINT    0

S: TOTAL NUMBER OF LOCAL FEATURE POINTS
R: REDUCTION RATIO 1/2
N: MAXIMUM SCALE NUMBER

IMAGE PROCESSING APPARATUS AND CONTROL METHOD THEREFOR

BACKGROUND

A method for searching for similar images using an image local feature amount (local feature amount) has been proposed. In this method, first, a feature point (local feature point) is extracted from the image. As a document disclosing this technique, C. Harris and M. J. Stephens, "A combined corner and edge detector," In Alvey Vision Conference, pages 147-152, 1988. is given.

Further, a technique for calculating a feature amount (local feature amount) corresponding to the local feature point based on the local feature point and its peripheral image information is known. A document disclosing the technique, David G. Lowe, "Distinctive Image Features from Scale-Invariant Keypoints," International Journal of Computer Vision, 60, 2 (2004), pp. 91-110 is given. The image search is performed by matching local feature amounts.

Further, Japanese Patent Laid-Open No. 2011-43969 discloses an image feature point extraction method to obtain plural image data by fluctuating the image and narrowing down to stabled feature points to extract a feature point from image data.

SUMMARY

According to an aspect of the invention, there is provided an image processing apparatus for extracting, from an input image, a plurality of pairs of local feature point to specify the input image and local feature amount as a feature amount in the local feature point, comprising: a local feature amount extraction unit configured to extract a local feature point and a local feature amount in the local feature point from a given image; a rotation processing unit configured to perform rotation processing at a previously set angle on the input image; and a determination unit configured to estimate stability of local feature points and feature amounts, obtained by applying the local feature amount extraction unit to respective images before and after the rotation processing by the rotation processing unit, and to determine pairs of local feature points and local feature amounts, for a predetermined number of pairs, as effective local feature points and local feature amounts with respect to the input image, sequentially from a pair with a highest stability.

Further features of the present disclosure will become apparent from the following description of exemplary embodiments (with reference to the attached drawings).

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Hereinbelow, the embodiments of the present invention will be described in detail in accordance with the attached drawings.

First Embodiment

In the first embodiment, local feature amount extraction processing of detecting a local feature point from an input image and extracting an invariable local feature amount regardless of rotation or enlargement/reduction in the feature point will be described.

Figure 13:
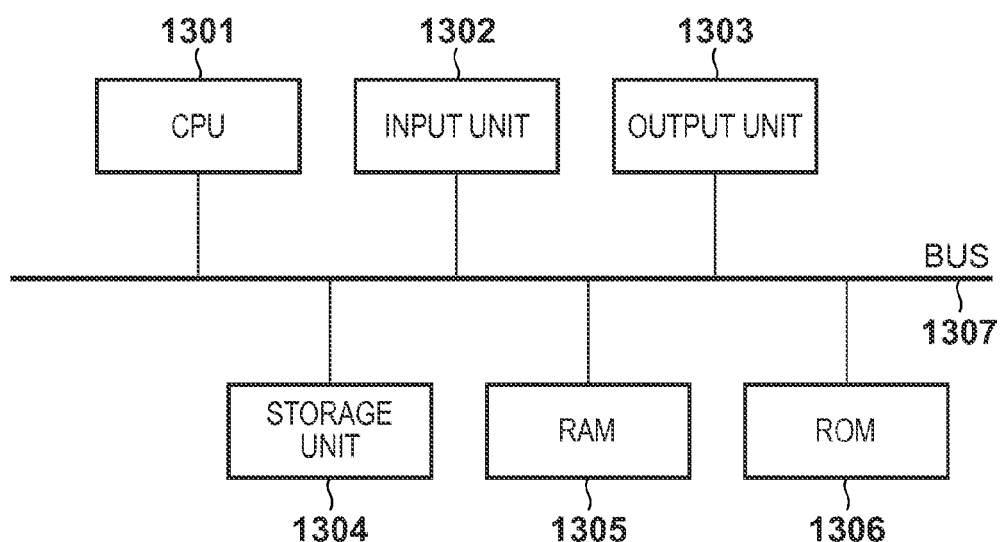
FIG. 13 illustrates an apparatus configuration to execute the processing in the embodiments.

First, FIG. 13 shows a configuration of an image processing apparatus according to the first embodiment. The image processing apparatus has a CPU (Central Processing Unit) 1301, an input unit 1302, an output unit 1303, a storage unit 1304, a RAM (Random Access Memory) 1305, a ROM (Read Only Memory) 1306 and a BUS 1307. The operations of these units will be described. First, the CPU 1301 performs logical operation, determination and the like for various data processings, and controls various constituent elements connected via the BUS 1307. As the input unit 1302, a keyboard having letter symbol input keys including alphabet keys, Hiragana (Japanese syllabary characters) keys, Katakana (the square form of Japanese syllabary characters) keys, punctuation marks and the like, and various function keys including a cursor key to indicate cursor movement and the like, is connected. Further, an image sensor such as a camera to input an image for calculation of local feature amount, or a storage such as an HDD to hold and input an image recorded with the image sensor, is connected. Further, a pointing device to indicate a controllable position of a screen on a GUI (Graphical User Interface) and to make a function selection or the like, such as a mouse or a stick pointer is connected. The output unit 1303 is a unit for various displays such as a liquid crystal panel. Various information such as input/output data and processing programs are stored in the storage unit 1304. As a storage medium to hold these data and programs, a hard disk, a CD-ROM, a DVD-ROM, a flash memory or the like can be used. The RAM 1305 is used for temporary storage of various data from the respective constituent elements. The ROM 1306 holds control programs such as the processing program executed in the present embodiment. All these constituent elements are connected via the BUS 1307.

Figure 1:
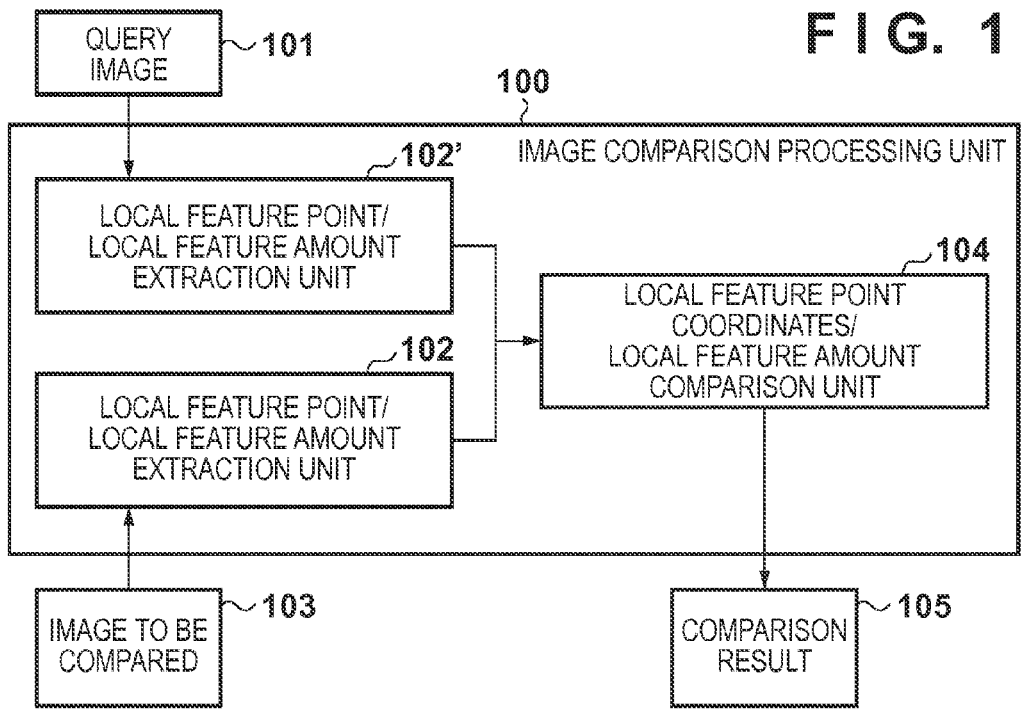
FIG. 1 is a block diagram showing an example of the configuration of an image comparison apparatus.

FIG. 1 is a block diagram showing an example of the configuration of an image comparison apparatus in the first embodiment. As shown in FIG. 1, the image comparison apparatus 100 has local feature point/local feature amount extraction units 102 and 102' and local feature point coordinates/local feature amount comparison unit 104. A comparison result 105 is outputted from the local feature point coordinates/local feature amount comparison unit 104. The local feature point/local feature amount extraction units 102 and 102' extract local feature points/local feature amounts from a query image 101 and an image to be compared 103 (image to be registered in a database), and the local feature point coordinates/local feature amount comparison unit 104 outputs the comparison result 105.

Generally, in a search processing unit, a local feature point coordinates/local feature amount of an image to be compared is previously obtained, and registered, with linkage to a registered image, in an image feature database. Then, upon search, a local feature point coordinates/feature amount is extracted from the query image, then it is compared with the local feature point coordinates/local feature amounts of registered images in the image feature database, then the local feature point coordinates/local feature amounts are sorted in descending order of similarity, and a search result is obtained. In the first embodiment, the explanation up to the comparison processing will be made, and the explanation of the search processing will be omitted.

Figure 2:
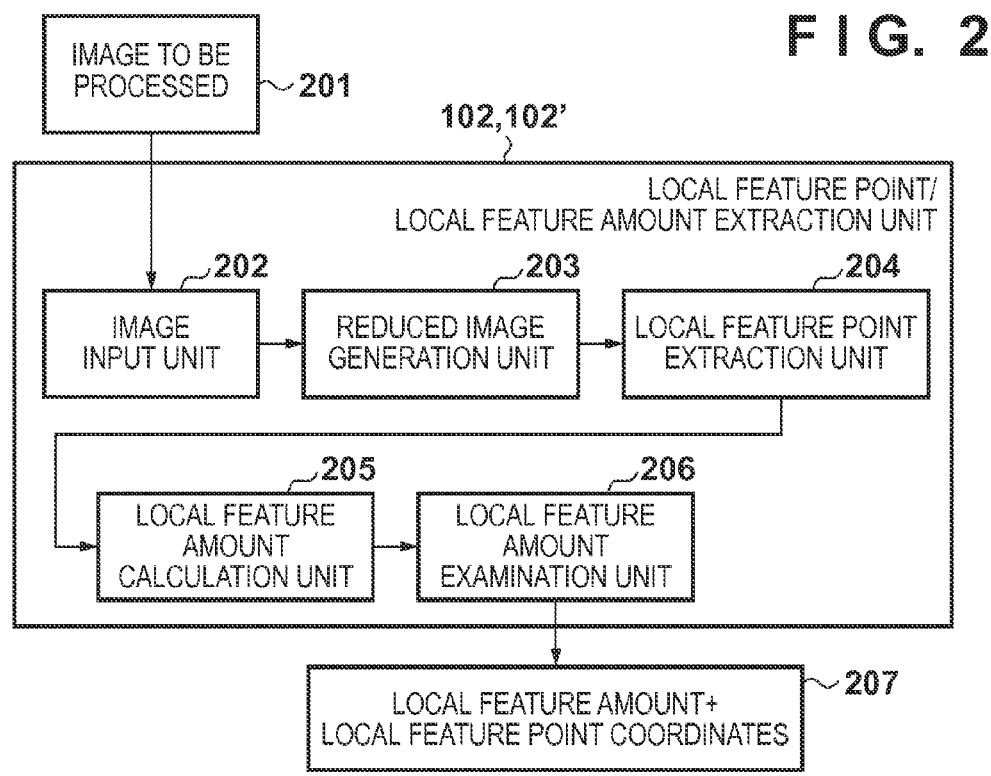
FIG. 2 is a block diagram showing an example of the configuration of a local feature point/local feature amount extraction unit.

FIG. 2 is a block diagram showing an example of the configuration inside the local feature point/local feature amount extraction units 102 and 102'.

As an image to be processed 201, a query image or an image to be compared is an input image. A reduced image generation unit 203 generates a reduced image from the image to be processed 201 inputted in an image input unit 202. A local feature point extraction unit 204 extracts a local feature point from the generated reduced image. Then, a local feature amount calculation unit 205 calculates a local feature amount of the local feature point, and a local feature amount examination unit 206 examines the local feature amount. When the image to be processed 201 is the query image 101, an examination result 207 is the local feature appoint coordinates/local feature amount of the query image, while when the image to be processed 201 is the image to be compared 103, the examination result 207 is the local feature point coordinates/local feature amount of the image to be compared.

[Image Local Feature Point Coordinates/Local Feature Amount Extraction Processing]

Figure 3:
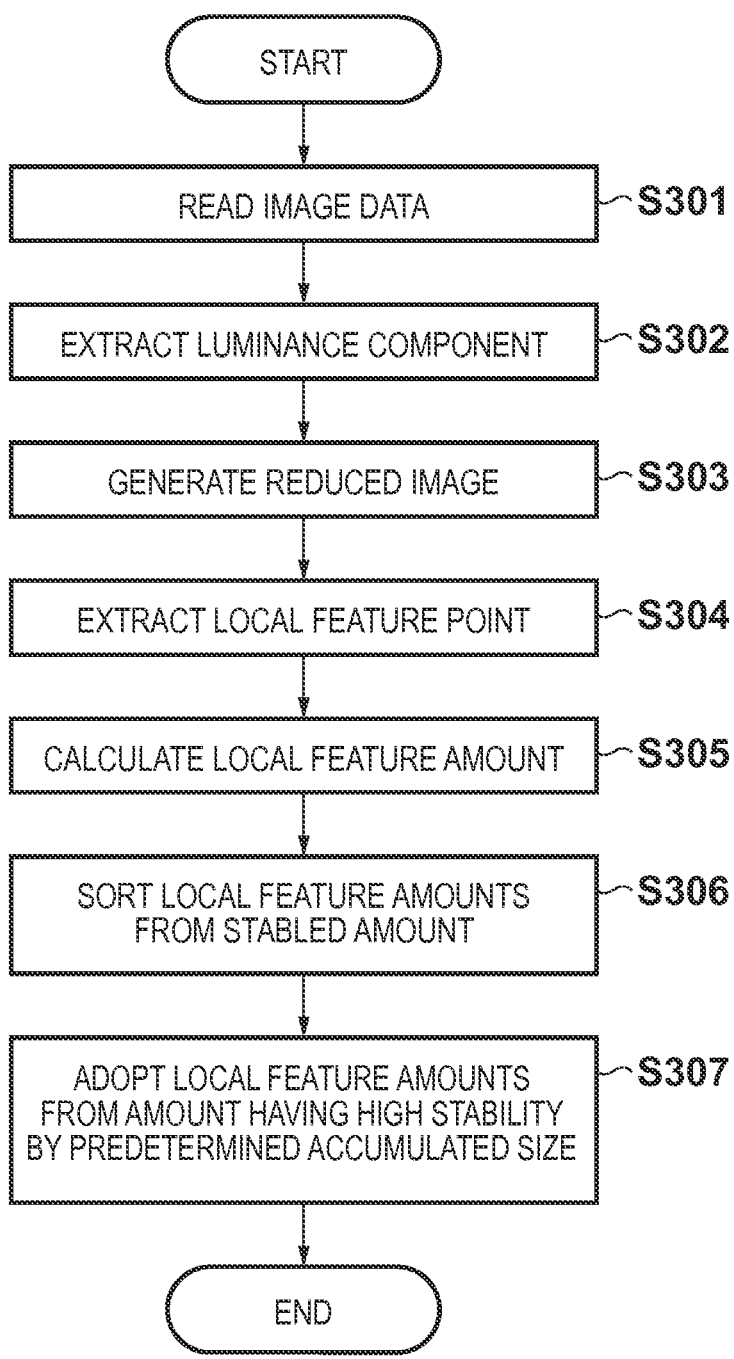
FIG. 3 is a flowchart showing a procedure of image local feature point/local feature amount extraction processing.

First, the operation of the respective processing units upon image registration will be described. FIG. 3 is a flowchart showing a control procedure of image registration processing in the local feature point/local feature amount extraction units 102 and 102'. At step S301, the image input unit 202 shown in FIG. 2 reads the image to be compared 103, then at step S302, extract a luminance component from the image to be compared 103. Then, a luminance component image is generated based on the extracted luminance component, and the generated luminance component image is provided to the reduced image generation unit 203.

Next, at step S303, the reduced image generation unit 203 repeats reduction of the luminance component image provided from the image input unit 202 sequentially in accordance with scale factor (reduction ratio) p, thus generates n reduced images including the original image, stepwise reduced from the image in the original size, and provides the reduced images to the local feature point extraction unit 204. Note that the scale factor/magnification of the scale factor/magnification p and the number of reduced images n are previously determined.

Figure 4:
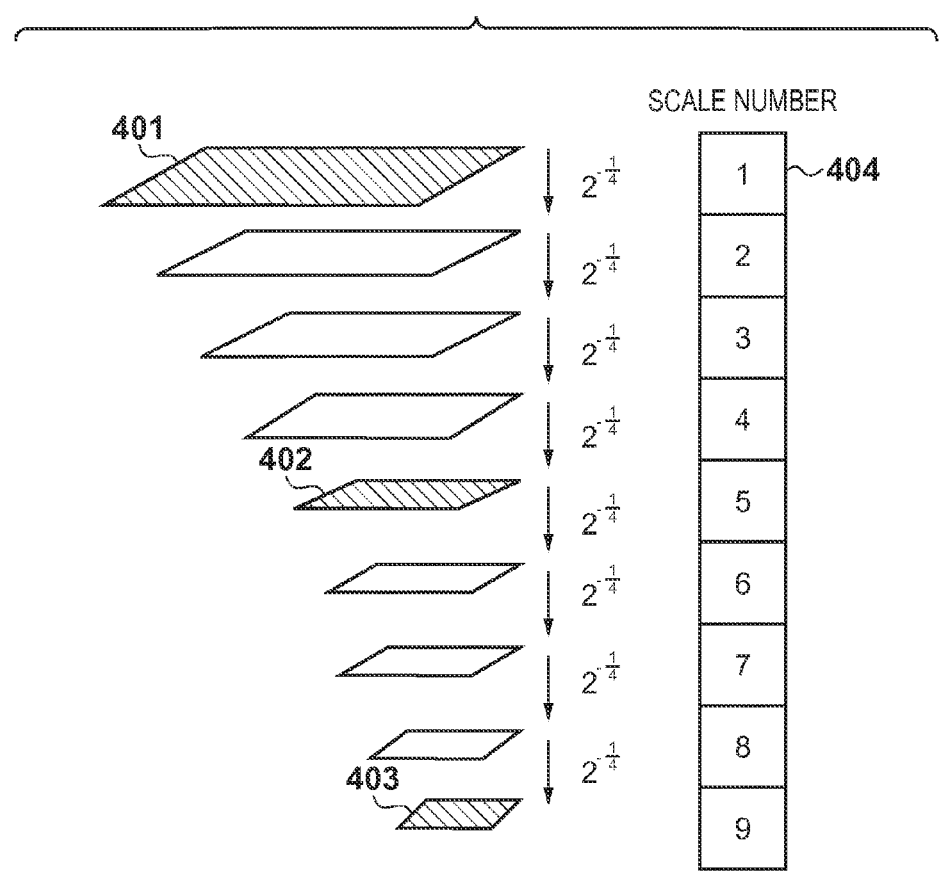
FIG. 4 illustrates an example of reduced image generation processing.

FIG. 4 illustrates an example of the processing by the reduced image generation unit 203 to generate a reduced image. The example in FIG. 4 shows a case where the scale factor p is "$2^{-(1/4)}$" and the number of reduced images n is "9". Note that the scale factor/magnification p is not necessarily "$2^{-(1/4)}$". In FIG. 4, reference numeral 401 denotes the luminance component image provided from the image input unit 202. Numeral 402 denotes a reduced image obtained by recursively performing reduction processing four times on the luminance component image in accordance with scale factor/magnification p. Numeral 403 denotes a reduced image obtained by performing reduction processing eight times on the luminance component image in accordance with the scale factor p.

In this example, in the reduced image 402, the horizontal and vertical directional sizes of the luminance component image provided from the image input unit 202 are reduced to ½, and in the reduced image 403, the horizontal and vertical directional sizes of the luminance component image provided from the image input unit 202 are reduced to ¼. Note that any method for image reduction can be used. In the first embodiment, a reduced image is generated using a reduction method by linear interpolation.

Next, at step S304, the local feature point extraction unit 204 extracts a local feature point which is extracted in robust state even when each of the n reduced images provided from the reduced image generation unit 203 is rotated. The extracted local feature point is provided to the local feature amount calculation unit 205. As this local feature point extraction method, in the first embodiment, Harris operator (see C. Harris and M. J. Stephens, "A combined corner and edge detector," In Alvey Vision Conference, pages 147-152, 1988.) is used.

More particularly, regarding a pixel on an output image H obtained by using the Harris operator, pixel values of the pixel and its eight peripheral pixels (total nine pixels) are examined. Then, a point where the pixel becomes the local maximum (the pixel value of the pixel becomes the maximum among the nine pixels) is extracted as a local feature point. Note that even though the pixel becomes the local maximum, when the value of the pixel is equal to or lower than a threshold value, the point is not extracted as a local feature point.

Note that any other feature point extraction method than the above-described feature point extraction method by the Harris operator is applicable to the local feature point extraction unit 204 as long as it can be used for extracting a local feature point.

Next, at step S305, the local feature amount calculation unit 205 calculates a feature amount (local feature amount) defined to be invariable even when image rotation has been made in each of the local feature points provided from the local feature point extraction unit 204. The extracted local feature amount is outputted, linked to the local feature point coordinates, as local feature amount+local feature point coordinates 207. As a method for calculating the local feature amount, in the first embodiment, a combination of Local Jet and their derivatives (see J. J. Koenderink and A. J. van Doorn, "Representation of local geometry in the visual system," Riological Cybernetics, vol. 55, pp. 367-375, 1987.) is used.

More particularly, a local feature amount V is calculated with the following expression (1).

$$V = \begin{pmatrix} L \\ L_x L_x + L_y L_y \\ LL_{xx}L_x L_x + 2L_{xy}L_x L_y + L_{yy}L_y L_y \\ L_{xx} + L_{yy} \\ L_{xx}L_{xx} + 2L_{xy}L_{xy} + L_{yy}L_{yy} \end{pmatrix} \quad (1)$$

Note that the symbols used in the right side of the expression (1) are defined in the following expressions (2) to (7). Note that the right side G(x, y) of the expression (2) is a Gaussian function; I(x, y), a pixel value in coordinates (x, y) of the image; and "*", a symbol indicating a convolution operation. Further, the expression (3) is a partial derivative regarding x of a variable L defined in the expression (2); the expression (4), a partial derivative regarding y of the variable L; the expression (5), a partial derivative regarding y of a variable Lx defined in the expression (3); the expression (6), a partial derivative regarding x of the variable Lx defined in the expression (3); and the expression (7), a partial derivative regarding y of a variable Ly defined in the expression (4).

$$L = G(x, y) * I(x, y) \quad (2)$$

$$L_x = \frac{\partial L}{\partial x} \quad (3)$$

$$L_y = \frac{\partial L}{\partial y} \quad (4)$$

$$L_{xy} = \frac{\partial^2 L}{\partial x \partial y} \quad (5)$$

$$L_{xx} = \frac{\partial^2 L}{\partial x^2} \quad (6)$$

$$L_{yy} = \frac{\partial^2 L}{\partial y^2} \quad (7)$$

Note that any other feature amount calculation method than the above-described feature amount calculation method is applicable as long as it is possible to calculate a local feature amount.

The examination processing in the first embodiment is performed at step S306. A comparison of local feature amount is made between an original image and a reduced image subjected to 45° rotation processing, and stability of local feature amount is estimated. Although a local feature amount is regardless of rotation in principle, fluctuation of local feature amount to some degree occurs upon actual rotation processing and image reduction processing. The influence of the fact is not negligible. The influence of linear interpolation upon rotation/enlargement/reduction of digital image causes fluctuation of local feature amount.

In the first embodiment, the examination processing is performed utilizing image rotation, however, examination processing utilizing enlarged or reduced image may be performed. In this case, the enlargement/reduction may be made in a different ratio from that upon scale image generation.

Figure 5:
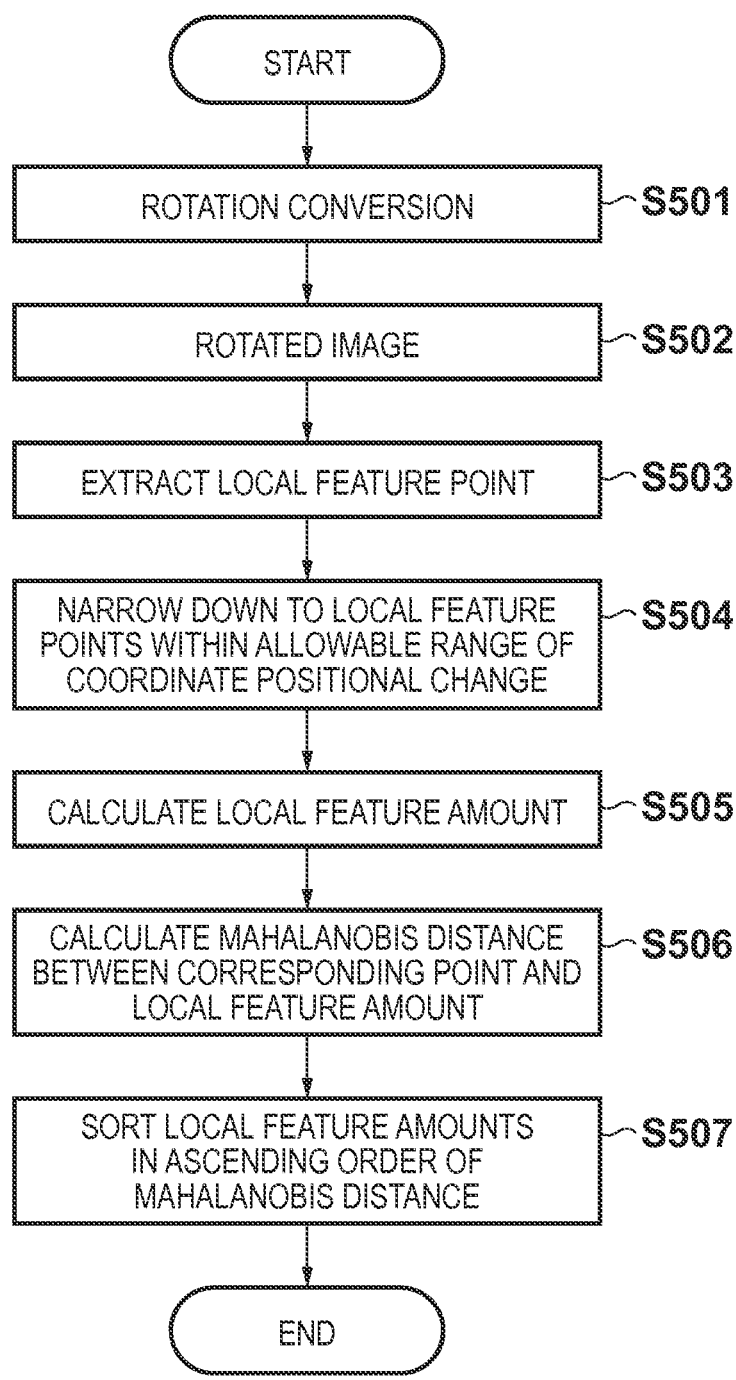
FIG. 5 is a flowchart showing processing of local feature amounts sorting from a stabled local feature amount in consideration of rotational fluctuation.

The flowchart of FIG. 5 shows a detailed flow of the processing at step S306. At step S306, the local feature amount examination unit 206 obtains fluctuations of the respective local feature amounts provided from the local feature amount calculation unit 205, and sorts them from a local feature amount with the smallest fluctuation. At step S303, the reduced image generation unit 203 sequentially reduces the luminance component image provided from the image input unit 202 in accordance with the scale factor/magnification p and generates n reduced images. The reduced images are read at step S501, then the images are subjected to 45 rotation conversion at step S502. Then at step S503, the reduced images are provided to the local feature point extraction unit 204. Note that the scale factor/magnification p and the number of reduced images n are the same values as those used in the above-described processing without rotation.

Next, at step S504, the local feature point extraction unit 204 extracts a local feature point which is extracted in robust state even when each of the n reduced images provided from the reduced image generation unit 203 is rotated. The extracted local feature point is provided to the local feature amount calculation unit 205. As this local feature point extraction method, the Harris operator is used as in the case of the processing without rotation.

More particularly, regarding a pixel on an output image H obtained by using the Harris operator, pixel values of the pixel and its eight peripheral pixels (total nine pixels) are examined. Then, a point where the pixel becomes the local maximum (the pixel value of the pixel becomes the maximum among the nine pixels) is extracted as a local feature point. Note that even though the pixel becomes the local maximum, when the value of the pixel is equal to or lower than a threshold value, the point is not extracted as a local feature point.

Note that any other feature point extraction method than the above-described feature point extraction method by the Harris operator is applicable to the local feature point extraction unit 204 as long as it can be used for extracting a local feature point.

Figure 6:
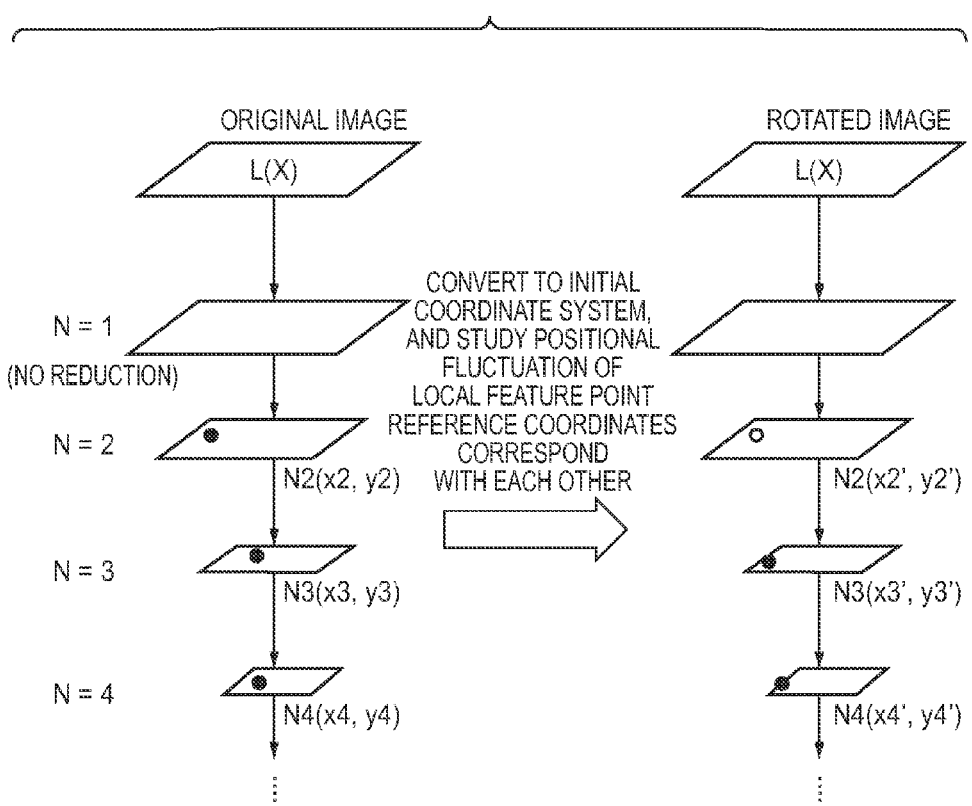
FIG. 6 is a conceptual diagram of estimation of positional change of local feature point obtained from a rotated image.

At step S504, processing of deleting local feature points, in which the fluctuation of local feature point coordinates is without an allowable range before and after the rotation, to narrow down the local feature points, is performed. FIG. 6 shows this conception. A scale image on the left side is an image before the rotation. A scale image on the right side is a rotated scale image for feature extraction. The rotated status of this image is reversed for comprehensibility. A point N2 indicates that the coordinates are within the allowable range before and after the rotation. Regarding other points N3 and N4, the fluctuations of the positions of the corresponding local feature points are without the allowable range before and after the rotation.

Next, at step S505, the local feature amount is calculated with the expression (1) using the combination of the Local Jet and their derivatives. In this example, from the rotate-converted 45° reduced image, a local feature amount (45°) is calculated by the same method as that used in the calculation by the local feature amount calculation unit 205 at step S305. Note that for the sake of simplification of explanation thereinafter, the local feature amount provided from the local feature amount calculation unit 205 will be described as "local feature amount (0°)".

Then at step S506, a comparison of Mahalanobis distance is made between the local feature amount (0°) and the local feature amount (45°). Then the local feature amount (0°) in the local feature point of interest and its Mahalanobis distance, as a pair, are temporarily stored. Note that as a variance-covariance matrix for calculation of Mahalanobis distance, a matrix statistically obtained from many local feature amounts in advance is used.

The Mahalanobis distance is used as an inter-feature distance so as to improve the accuracy in estimation of local feature amount stability by taking distribution in feature space into consideration. When high-speed processing is desired even by sacrificing the accuracy, Euclidean distance may be used. Then, with respect to all the local features points narrowed down at step S504, the Mahalanobis distance indicating a local feature fluctuation before and after the 45° rotation is obtained and temporarily stored.

Then, at step S507, all the local feature point coordinates/local feature amounts (0°) are sorted in the ascending order of Mahalanobis distance. That is, even though the 45° rotation has been made, the local feature amounts are stored in the order of sustainability against alteration of position of local feature point and its local feature amount.

Returning to the flowchart of FIG. 3, at step S307, when the size of local feature amount description (local feature point coordinates+local feature amount) per one image is limited, the local feature amounts are stored until the accumulated size of the pairs of the sorted local feature points and the local feature amounts (0°) becomes the limit of the feature amount description size (the limit of the number of feature amounts).

Figure 12:
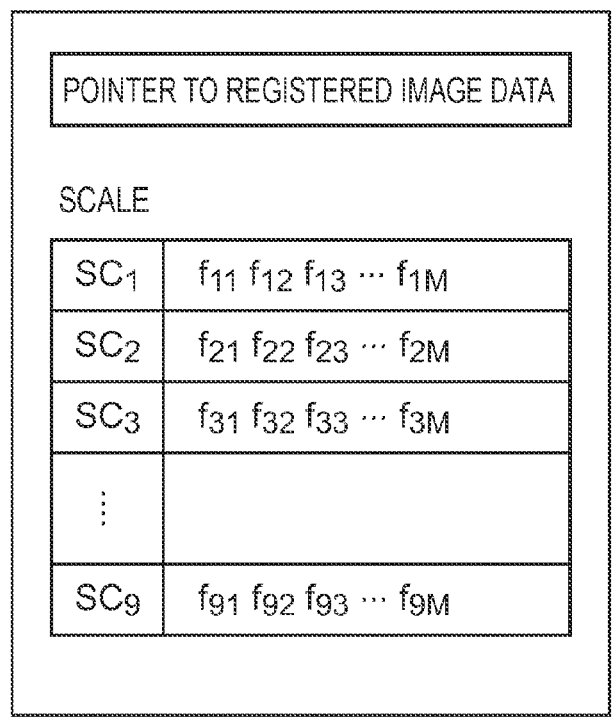
FIG. 12 illustrates an example of an index table of local feature points and local feature amounts.

By the above-described processing, the local feature points/local feature amounts are extracted from the image to be registered in the image database (not shown), and they are registered in an index table upon image search. FIG. 12 illustrates an example of the index table of local feature points/local feature amounts to specify an image extracted upon registration into the image database. As shown in FIG. 12, the table has an area to store a pointer to the image to be registered in the image data (otherwise, when the image to be registered is an image file, a file name with a path of the image file) and an area to store a local feature point/local feature amount data string sorted by scale (by reduced image). As n=9 holds in the present embodiment, the scale types are nine, i.e., SC1 to SC9 as shown in the figure. The sorted local feature points/local feature amounts denoted by fi1 to fiM (i indicates a scale and has a value from 1 to 9. M is a previously set value) are held.

In this manner, in the first embodiment, a reduced image is rotate-converted, the degree of fluctuation of local feature amount is previously examined, and the local feature amounts are stored sequentially from one with a limited local feature amount size and small fluctuation.

Portable devices having an image sensing function such as a cellular phone, a smart phone and a digital camera are increased. They have different computing powers and memories, accordingly, it is preferable that they have local feature amount calculation processing and feature amount description size corresponding to the resources of these devices. For example, it is preferable that in a digital camera, where the computing power is not high and the memory capacity is not large, the local feature amount extraction processing is simple and the feature amount description size is small. On the other hand, in a PC or a server, the local feature amount calculation processing and the feature amount description size are not strictly limited in comparison with the portable terminal, and the computing power is high.

In this manner, in some cases, the local feature amount calculation processings and the feature amount description sizes necessary in the respective terminals and PCs/servers are different. In such case, it is desirable that the processing is performed without any trouble.

In other words, it is desirable that even when the local feature amount calculation processing and the total local feature amount description size differ, the accuracy in similarity comparison processing does not not degrade. For this purpose, in a rich environment such as a server, it is desired that description is made by a local feature amount for a large total size, while in a poor terminal device, description is made by a small local feature amount for a small total size, and these local feature amounts are related by inclusion (relation of partial correspondence). Further, to maintain search accuracy even in a small local feature size, selection is made from stabled feature points having small local feature amount fluctuation for a predetermined size (capacity).

Note that in the first embodiment, with the rotation angle 45° as rotation angle upon examination, only the 45° rotation examination is performed. However, it may be arranged such that not only the 45° rotation examination but other rotation examinations from e.g. 0° to 90° are performed by to. Note that t is a value which satisfies predetermined relation, 0<t<90.

[Inter-Image Similarly Calculation Method]

Figure 7:
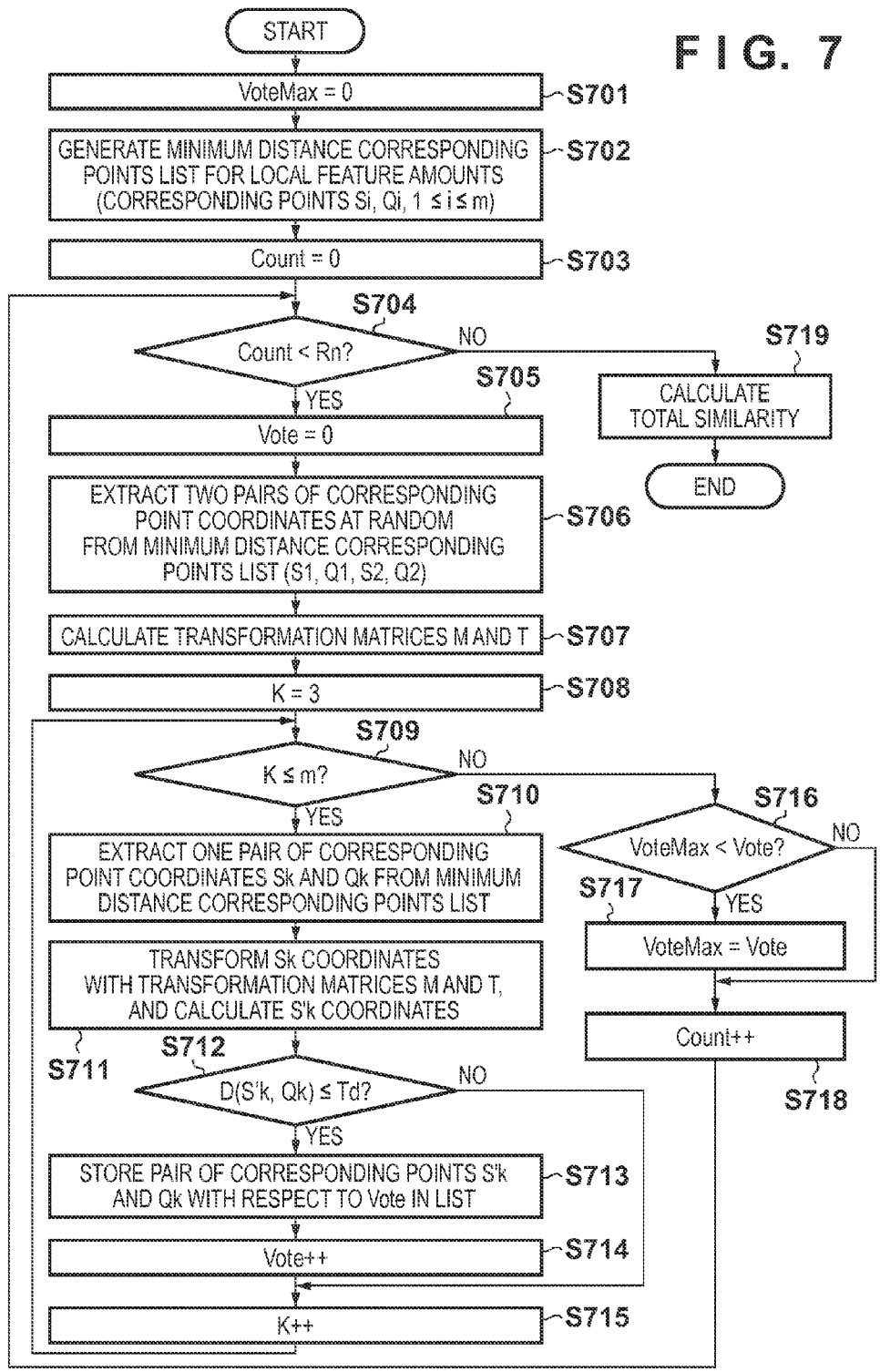
FIG. 7 is a flowchart showing a procedure of local feature point/local feature amount comparison processing.

Next, as a similarity index calculation method, the local feature point coordinates/local feature amount comparison unit 104 will be described using the flowchart of FIG. 7.

Note that the local feature amount of the query image 101 is Vq, the local feature point linked to the local feature amount, Q, the coordinates, Q(x', y'). Further, the local feature amount existing in the image to be compared 103 is Vs, the local feature point linked to the local feature amount, S, and the coordinates, S (x, y).

First, at step S701, a variable VoteMax indicating a final number of votes is initialized to 0. Next, at step S702, the inter-feature amount distance between the local feature amount Vq and the local feature amount Vs is calculated with respect to all the combinations, and a minimum distance corresponding points list is generated. That is, using a threshold value Tv, a combination between the local feature amounts Vq and Vs (corresponding points), regarding which the calculated distance between the feature amounts is equal to or less than the threshold value and is a minimum distance, is extracted, and registered in the minimum distance corresponding points list.

Hereinafter, regarding the k-th corresponding points registered in the minimum distance corresponding points list, as the local feature amounts in the corresponding points, Vq(k) and Vs(k) are described. Further, as the local feature points linked to the local feature amounts Vq(k) and Vs(k), Qk and Sk are described, and as the coordinates with suffixes, Qk(x'$_k$, y'$_k$), Sk(x$_k$, y$_k$). Further, as the number of corresponding lists registered in the minimum distance corresponding points list, m is described.

Next, at step S703, a variable Count indicating the count number of repetitive similarity calculation processing is initialized to 0. Next, at step S704, it is determined whether or not the repetitive count number Count is over a maximum number of times of previously-determined repetitive processing Rn. When it is determined that the repetitive count number Count is over the maximum number Rn, the process proceeds to step S719, at which the final number of votes VoteMax is outputted as a similarity index, and the process ends.

Further, at step S704, when the repetitive count number Count is not over the maximum number of times of repetitive processing Rn, the process proceeds to step S705, at which the variable Vote indicating the number of votes is initialized to 0. Next, at step S706, two pairs of coordinates of the corresponding points are extracted at random from the minimum distance corresponding points list. These coordinates are described as Q1(x'$_1$, y'$_1$), S1(x$_1$, y$_1$) and Q2(x'$_2$, y'$_2$), S2(x$_2$, y$_2$). Next, at step S707, assuming that the extracted coordinates Q1(x'$_1$, y'$_1$), S1(x$_1$, y$_1$) and Q2(x'$_2$, y'$_2$), S2(x$_2$, y$_2$) satisfy the conversion indicated in the expression (8), the variables a to f in the expression (8) are obtained.

Note that at step S607 in FIG. 6, a matrix having the variables a to d is denoted by M, and a matrix having the variables e to f, T.

$$\begin{pmatrix} x'_k \\ y'_k \end{pmatrix} = \begin{pmatrix} a & b \\ c & d \end{pmatrix} \begin{pmatrix} x_k \\ y_k \end{pmatrix} + \begin{pmatrix} e \\ f \end{pmatrix} \quad (8)$$

In the first embodiment, for the sake of simplification, only similarity transformation is taken into consideration. At this time, the above expression (8) is rewritten as the following expression (9).

$$\begin{pmatrix} x'_k \\ y'_k \end{pmatrix} = \begin{pmatrix} a & -b \\ c & d \end{pmatrix} \begin{pmatrix} x_k \\ y_k \end{pmatrix} + \begin{pmatrix} e \\ f \end{pmatrix} \quad (9)$$

At this time, the variables a, b, e and f are represented, using $x'_1, y'_1, x_1, y_1, x'_2, y'_2, x_2, y_2$, with expressions (10) to (13).

$$a = \frac{(x_1 - x_2)(x'_1 - x'_2) + (y_1 - y_1)(y'_1 - y'_2)}{(x_1 - x_2)^2 + (y_1 - y_2)^2} \quad (10)$$

$$b = \frac{(x_1 - x_2)(y'_1 - y'_2) + (y_1 - y_1)(x'_1 - x'_2)}{(x_1 - x_2)^2 + (y_1 - y_2)^2} \quad (11)$$

$$c = \frac{(y'_1 - y'_2)(x_1 y_2 - x_2 y_1) - (x'_1 + x'_2)(x_1 x_2 + y_1 y_2) + x'_1(x_2^2 + y_2^2) + x'_2(x_1^2 + y_1^2)}{(x_1 - x_2)^2 + (y_1 - y_2)^2} \quad (12)$$

$$d = \frac{(x'_1 - x'_2)(y_1 x_2 - y_2 x_1) - (y'_1 + y'_2)(y_1 y_2 + x_1 x_2) + y'_1(y_2^2 + y_2^2) + y'_2(y_1^2 + x_1^2)}{(x_1 - x_2)^2 + (y_1 - y_2)^2} \quad (13)$$

Next, at step S708, to select the other points than the two pairs of points extracted at random from the minimum distance corresponding points list at the above-described step S705, a corresponding points selection variable k is initialized to 3. Then, at step S709, it is determined whether or not the corresponding points selection variable k is over the number of pairs of corresponding points m registered in the minimum distance corresponding points list. When it is determined that the corresponding points selection variable k is over the number of pairs of corresponding points m, the process proceeds to step S715. The processing at step S715 will be described later. When it is determined in the determination at step S709 that the corresponding points selection variable k is not over the number of pairs of corresponding points m registered in the minimum distance corresponding points list, the process proceeds to step S710.

At step S710, the points other than the two pairs of points extracted at random from the minimum distance corresponding points list, $S1(x_2, y_2)$ and $S2(x_2, y_2)$ are extracted from the minimum distance corresponding points list. In the first embodiment, as the extracted point, $Sk(x_k, y_k)$ is described. Next, at step S711, coordinates $Sk'(x'_k, y'_k)$ moved from $Sk(x_k, y_k)$ using the expression (9) are obtained. Thereafter, at step S712, a geometric distance between the coordinates Sk' $(x'_k, y'_k)$, and the coordinates $Qk(x'_k, y'_k)$ is calculated using Euclidean distance, and it is determined whether or not the Euclidean distance is equal to or less than a threshold value Td. When it is determined that the Euclidean distance is equal to or less than the threshold value Td, the process proceeds to step S713, at which Sk', Qk of a corresponding point of Vote are registered in the list, and at step S714, the number of votes Votes is incremented. Further, when it is determined that the Euclidean distance is greater than the threshold value Td, the process proceeds to step S715 without any processing.

At step S715, the corresponding points selection variable k is incremented, then the process returns to step S709, at which the above-described processing is repeated until the corresponding points selection variable k exceeds the number of pairs of corresponding points m registered in the minimum distance corresponding points list.

Next, step S716 to perform processing when the corresponding points selection variable k exceeds the number of pairs of corresponding points m registered in the minimum distance corresponding points list at step S709 will be described. At step S716, the value of the number of votes Vote and the value of the final number of votes VoteMax are compared, and when it is determined that the value of the number of votes Vote is greater than the value of the final number of votes VoteMax, the process proceeds to step S717.

At step S717, the value of the final number of votes VoteMax is substituted with the value of the number of votes Vote, then at step S718, the repetitive count number Count is incremented, and the process returns to the above-described step S704.

Further, at step S716, when it is determined that the value of the number of votes Vote is equal to or less than the value of the final number of votes VoteMax, the process proceeds to step S718, at which the repetitive count number Count is incremented, and the process returns to the above-described step S704.

Note that in the description of the similarity calculation method in the first embodiment, only the similarity transformation is taken into consideration, however, other geometric transformations such as affine transformation are applicable by obtaining respectively corresponding transformation matrices at step S703. For example, in the case of affine transformation, first, at step S706, the number of pairs of coordinates of corresponding points selected at random is set to 3. Next, at step S707, the variables a to f are obtained using the three pairs of corresponding points (total six points) selected at step S706 using, not the expression (9) but the expression (8).

Further, in the description of the similarity calculation method in the first embodiment, the final number of votes VoteMax is outputted as a similarity index at step S719, however, the present invention is not limited to this similarity index and any other similarity index may be calculated. That is, it may be arranged such that the processing at step S703 and the subsequent steps is not performed, but the number of pairs of corresponding points m registered in the minimum distance corresponding points list, generated at step S702, is outputted as a similarity index. With this arrangement, it is possible to improve a search speed while maintaining constant search accuracy.

As described above, in the image search apparatus according to the first embodiment, the fluctuations of local feature amounts calculated from a query image and a registered image are examined, and a local feature amount with large fluctuation is not used upon search. With this arrangement, it is possible to suppress degradation of the search accuracy in description of compact local feature amount.

Note that in the above-described embodiment, an image itself is rotated then a local feature amount is calculated, and the examination is performed using the calculated local feature amount. However, it may be arranged such that a filter, obtained by rotating a filter used for the local feature amount calculation in the local feature amount calculation unit 205 by 45° (45° rotated filter) is prepared in advance, and the examination is performed using the 45° rotated filter. Note that rotating the filter by 45° means geometric rotational conversion on a predetermined filter coefficient.

Further, in the similarity calculation processing, the sizes of local feature amount description in the query image and the image to be registered, i.e., the numbers of effective local feature points to be described, may be different. Since the local feature amount sorted from the viewpoint of stability are described, a large description size feature amount and a small description size feature amount are logically in relation of inclusion. Accordingly, in the first embodiment, even when the numbers of effective local feature points are different, all of them may be used in the distance calculation.

On the other hand, it may be arranged such that, in the case of high-speed processing, among the described local feature points in the query image and the image to be registered, the number of feature points N of an image with a smaller number of local feature points is used as a reference range number of feature points for the distance calculation in the image with a larger number of feature points. Since the local feature points are sorted and described from a local feature point with high stability, there is a high possibility of comparison between corresponding local feature points. It is possible to attain high-speed processing by reducing the number of feature points to be referred to.

Second Embodiment

Next, a second embodiment of the present invention will be described with reference to the drawings.

The feature of the second embodiment is, on the assumption that many of stabled local feature points/local feature amounts are obtained from a low frequency component, and an empirical rule that the influence of image noise is high in a high frequency component is used. Images are adopted from an low frequency component image in which a stabled local feature point can be obtained, i.e., an image with high reduction scale. As reduction (blurring) is advanced, the number of local feature points is reduced, and macro (big) local feature points remain.

FIG. 4 shows scale images as stepwise reduced images upon local feature amount extraction. As a scale number is bigger, the reduction processing is advanced. Then, using an empirical rule that the stability of a local feature point obtained from an image with high reduction scale is high, the processing is performed with the scale number as a stability index.

That is, as in the case of the first embodiment, regarding a pixel on an output image H obtained by using the Harris operator, pixel values of the pixel and its eight peripheral pixels (total nine pixels) are examined. Then, a point where the pixel becomes the local maximum (the pixel value of the pixel becomes the maximum among the nine pixels) is extracted as a local feature point. Note that even though the pixel becomes the local maximum, when the value of the pixel is equal to or lower than a threshold value, the point is not extracted as a local feature point.

Figure 8:
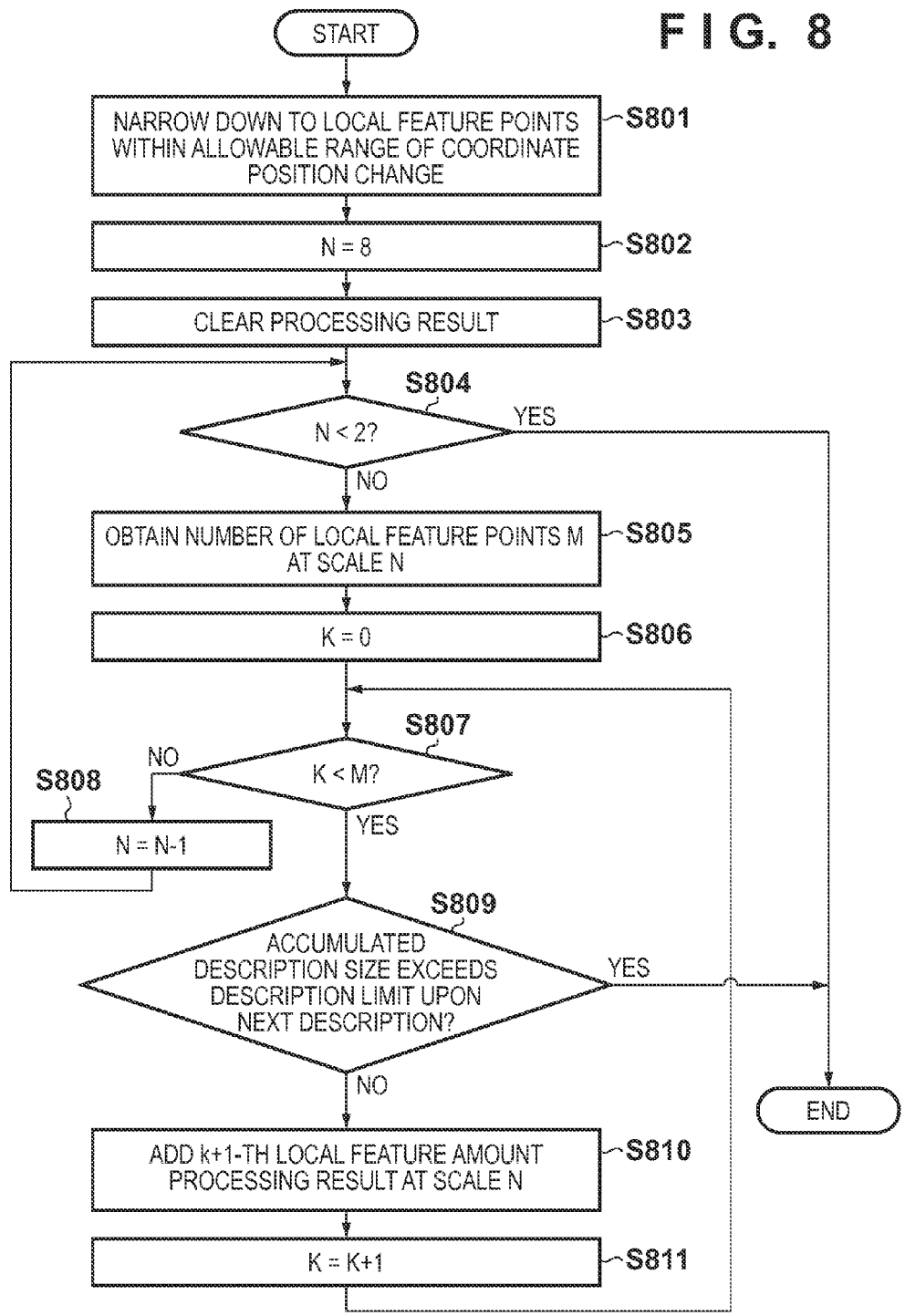
FIG. 8 is a flowchart showing the processing of sorting local feature amounts from a stabled local feature amount in consideration of scale.

The processing flow regarding the local feature amount extraction is the same as that of FIG. 3 used in the first embodiment, however, the contents of processing at steps S306 and S307 are different. Next, the processing in the second embodiment will be described based on the flow of FIG. 8 where the contents of processing at steps S306 and S307 are added.

Figures 9, 10:
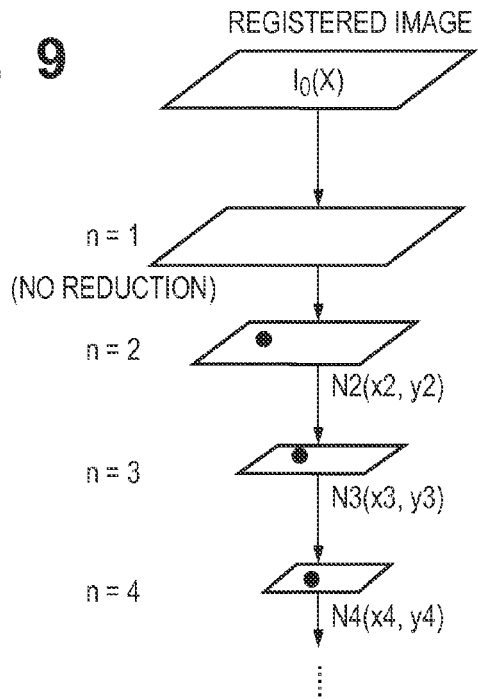
FIG. 9 is a conceptual diagram of estimation of positional change of local feature point.
FIG. 10 is a conceptual diagram showing determination of the number of local feature points to be described based on scale image area.

At step S801, as in the case of the first embodiment, the local feature points within an allowable range of coordinate positional change are determined (see FIG. 9). At step S802, a counter initial value corresponding to the scale number is set to 8. Since the nine scales are used in FIG. 4, the processing starts from the scale number 8 at which a local feature point can be obtained. At step S803, the processing result is cleared for initialization. At step S804, since there is no local feature point regarding the scale number 1, the process ends as "N<2" holds. On the other hand, when "N<2" is not satisfied, the number of local feature points M regarding a scale number N is obtained at step S805. The at step S806, a counter K is reset to 0, then at step S807, it is determined whether or not "K<M" is satisfied. When it is determined that it is not satisfied, i.e., description has been made by the number of local feature points M in the scale number N, the scale number N is decremented at step S808, and the process returns to step S804 again.

At step 807, when it is determined that "N<M" is satisfied, then at step S809, it is determined whether or not the description size exceeds an allowable description size upon next description. When it is determined that the description size exceeds the allowable description size, the process ends. On the other hand, when it is determined that the description size does not exceed the allowable description size, it is added to the k+1-th local feature amount processing result in the scale N at step S810.

Note that the order of local feature points K+1 in the scale N may be arranged such that the local feature points are distributed at random with respect to the images as much as possible. Then K is incremented at step S811, and the process returns to step S807.

With the above-described processing, as the processing result at step S306, the local feature point coordinates/local feature amounts are described sequentially from a local feature point with a maximum scale number.

At this time, when the size of local feature amount description for 1 image registered in an image feature database 107 is limited, the description of local feature point coordinates/ local feature amounts is started from the local feature point with the maximum scale number. Then the local feature amounts are stored until the accumulated size becomes the limitation of the total local feature amount description size, then the image registration processing ends. Note that the search processing is performed as in the case of the first embodiment.

In this manner, according to the second embodiment, registration is made from a low frequency component image where a stabled local feature point can be obtained upon image registration processing, i.e., an image with high reduction scale. Accordingly, in local feature amount description with size limitation, it is possible to suppress degradation of search accuracy.

Third Embodiment

Figure 11:
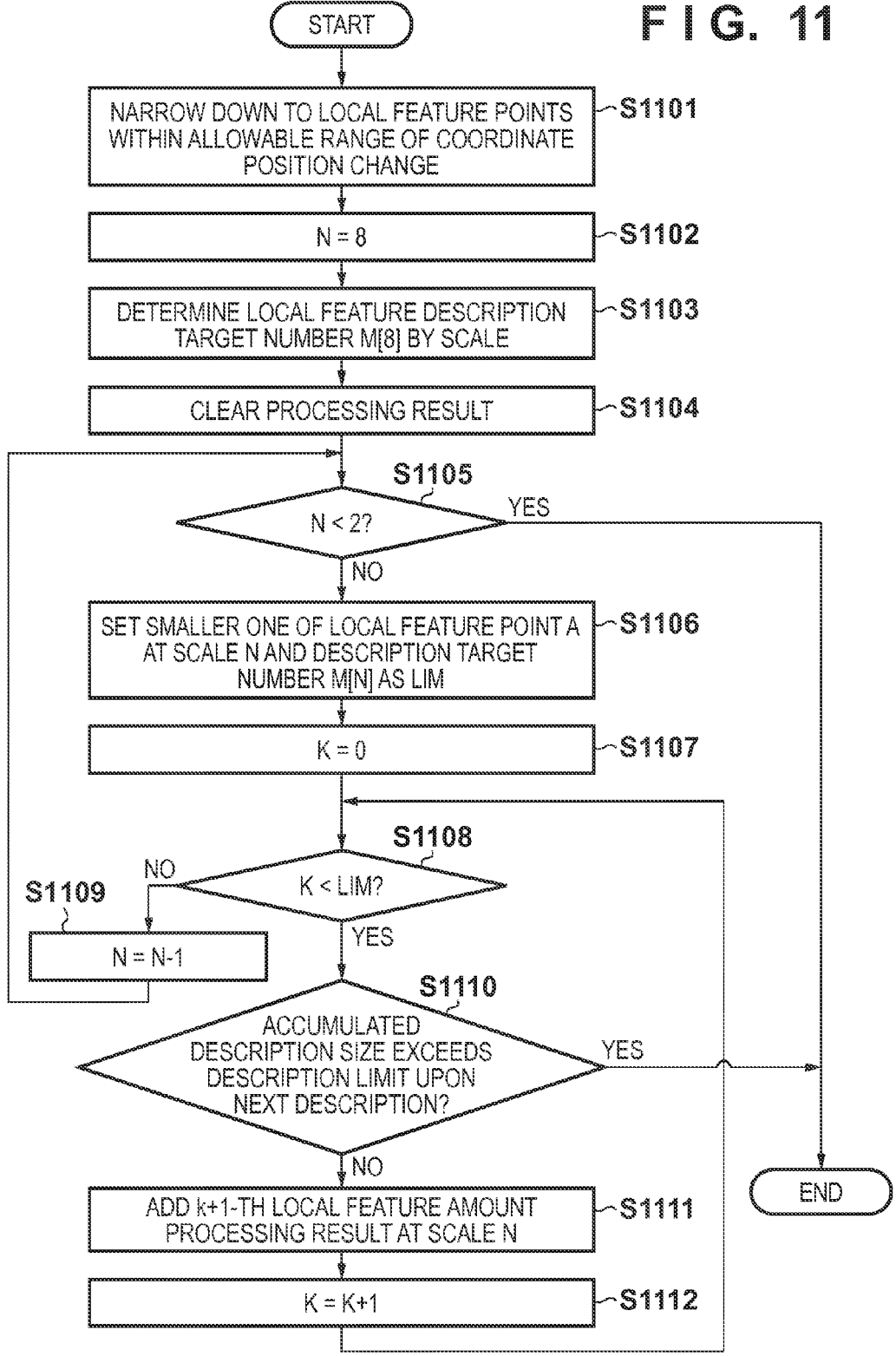
FIG. 11 is a flowchart showing a procedure of the image local feature point/local feature amount extraction processing according to a third embodiment.

The processing flow regarding the local feature amount extraction is the same as that of FIG. 3 used in the first embodiment, however, the contents of processing at steps S306 and S307 are different. Next, the processing in the third embodiment will be described based on the flow of FIG. 11 where the contents of processing at steps S306 and S307 are added. In plural scales (bands), the number of adopted local feature points is assigned independent upon scale, and the description is performed from a local feature amount with high stability within each scale.

In the third embodiment, a total number of local feature points S is assigned in correspondence with area ratio, however, it may be arranged such that a fixed number is used. Upon description of local feature amounts for the total number S, it may be arranged such that, assuming that the total number of descriptions is S and the reduction ratio is r in each scale, as shown in FIG. 10, a small number is determined as the number of local feature points S with respect to a small scale.

At step S1101, the local feature points within an allowable range of coordinate positional change are determined, as in the case of the first embodiment. At step S1102, the counter initial value corresponding to the scale number is set to 8. Since the nine scales are used in FIG. 4, the processing starts from the scale number 8 at which a local feature point can be obtained. At step S1103, in accordance with FIG. 10, a target number M[8] for local feature description for each scale is determined. The numbers are arrayed since the array elements correspond to the scales. Note that the values of the target numbers M[1] and M[8] are 0 since no local feature point exists in principle.

At step S1104, the processing result is cleared for initialization. At step S1105, since there is no local feature point in the scale number 1, the process ends as N<2 holds. On the other hand, when N<2 is not satisfied, smaller one of the number of local feature points A in the scale N and a target description number M[N] is set as LIM at step S1106. At step S1107, the counter K is reset to 0, then at step S1108, it is determined whether or not K<LIM is satisfied. When it is determined that it is not satisfied, i.e., the description has been made by the number of local feature points M in the scale N, the scale number N is decremented at step S1109, and the process returns to step S1105 again.

At step S1108, when it is determined that K<LIM is satisfied, then at step S1110, it is determined whether or not the description size exceeds an allowable description size upon next description. When it is determined that the description size exceeds the allowable description size, the process ends. On the other hand, when it is determined that the description size does not exceed the allowable description size, the k+1-th local feature amount with high stability in the scale N is added at step S1111. Regarding the stability of local feature amount, it may be arranged such that local feature point coordinates/local feature amount with small fluctuation with respect to image rotation described in the first embodiment are managed by each scale, and they are sorted from a local feature point coordinates/local feature amount with minimum Mahalanobis distance within the scale. Then at step S1112, the counter value K is incremented, then the process returns to step S1108.

In this manner, in the third embodiment, with respect to each scale (band), an appropriate local feature amount size is assigned, and the degree of local feature amount fluctuation is previously examined using a filter rotated in each scale, and the local feature amounts are described for the size assigned to the scale from a local feature amount with small fluctuation. Accordingly, it is possible to describe the local feature amounts, selected from the empirical rule that many local feature amounts are obtained from a low frequency component and have small fluctuation with respect to image change, in a predetermined size. Even when the local feature amounts are selected at random from the feature points within each scale, it is possible to describe local feature amounts with higher stability in comparison with a case where S local feature amounts are selected at random from local feature amounts in all the scales. Note that the search processing is performed as in the case of the first embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-237962, filed Oct. 28, 2011, which is hereby incorporated by reference herein in its entirety.

What is claimed is:

1. An image processing apparatus for extracting, from an input image, a plurality of pairs of a local feature point in the input image and a local feature amount as a feature amount in the local feature point, comprising:
   a local feature point extraction unit configured to extract a plurality of local feature points from the input image using a predetermined algorithm having robustness for image rotation;
   a feature amount calculation unit configured to calculate a local feature amount, having stability against image rotation, of each local feature point;
   a rotation processing unit configured to perform rotation processing at a previously set angle on said input image; and
   a determination unit configured to estimate stability of local feature points and local feature amounts, obtained by applying said local feature point extraction unit and said local feature amount calculation unit to respective images before and after the rotation processing by said rotation processing unit, and to determine a predetermined number of pairs of local feature points and local feature amounts as effective local feature points and local feature amounts with respect to said input image, sequentially from a pair with a highest stability, wherein the predetermined number depends upon a resource of the image processing apparatus but does not depend upon said input image,
   wherein at least one of the units is implemented by a processor.

2. The apparatus according to claim 1, further comprising a reduced image generation unit configured to generate reduced images in a plurality of stages, by recursively performing reduction processing with a previously set reduction ratio on said input image,
   wherein said rotation processing unit performs the rotation processing on each reduced image,
   and wherein said determination unit determines effective local feature points and local feature amounts by each reduced image.

3. The apparatus according to claim 1, wherein the number of effective local feature points and local feature amounts determined by said determination unit depends on a size of each reduced image.

4. A control method for an image processing apparatus for extracting, from an input image, a plurality of pairs of a local feature point in the input image and a local feature amount as a feature amount in said local feature point, comprising:

a local feature point extraction step of extracting a plurality of local feature points from the input image using a predetermined algorithm having robustness for image rotation;

a local feature amount calculation step of calculating a local feature amount, having stability against image rotation, of each local feature point;

a rotation processing step of performing rotation processing at a previously set angle on said input image; and a determination step of estimating stability of local feature points and local feature amounts, obtained by applying said local feature point extraction step and said local feature amount calculation step to respective images before and after the rotation processing at said rotation processing step, and determining a predetermined number of pairs of local feature points and local feature amounts as effective local feature points and local feature amounts with respect to said input image, sequentially from a pair with a highest stability, wherein the predetermined number depends upon a resource of the image processing apparatus but does not depend upon said input image.

5. A non-transitory computer-readable storage medium storing a program which is read and executed by a computer, for causing said computer to execute the respective steps in the method according to claim 4.

6. An image processing apparatus comprising:
an extraction unit to extract a plurality of feature points from an input image using a predetermined algorithm having robustness regarding the position of the feature point even if applying a predetermined change to the input image;

a feature amount calculation unit to calculate a feature amount in each feature point using a second predetermined algorithm;

an estimation unit to estimate fluctuation of the feature amount in said feature point when the predetermined change is applied to said input image; and a determination unit to select a predetermined number of feature points having a feature amount with small fluctuation based on said estimation, and to determine the feature amounts in said selected feature points as feature amounts with respect to said input image, wherein the predetermined number depends upon a resource of the image processing apparatus but does not depend upon said input image, wherein at least one of the units is implemented by a processor.

7. The apparatus according to claim 6, further comprising a reduced image generation unit to generate reduced images in a plurality of stages, by recursively performing reduction processing with a previously set reduction ratio on said input image, and wherein said determination unit selects the predetermined number of feature points and determines stabled feature amounts by each reduced image.

8. The apparatus according to claim 7, wherein said determination unit selects the feature points by a number assigned in correspondence with size of each reduced image.

9. The apparatus according to claim 6, further comprising a search unit to search for an image similar to the input image from images held in a holding unit using said determined feature amounts.

10. The apparatus according to claim 6, wherein said predetermined change is rotation.

11. The apparatus according to claim 6, wherein said fluctuation of feature amount is estimated using a Mahalanobis distance.

12. The apparatus according to claim 6, wherein said predetermined number is set based on a data capacity of feature amounts linked to said input image.

13. The apparatus according to claim 6, wherein said feature point is extracted using a Harris operator.

14. The apparatus according to claim 6, wherein said feature amount is an SIFT feature amount.

15. An image processing method comprising:
an extraction step of extracting a plurality of feature points from an input image using a predetermined algorithm having robustness regarding the position of the feature point even if applying a predetermined change to the input image;

a feature amount calculation step of calculating a feature amount in each feature point using a second predetermined algorithm;

an estimation step of estimating fluctuation of feature amount in said feature point when the predetermined change is applied to said input image; and a determination step of selecting a predetermined number of feature points having a feature amount with small fluctuation based on said estimation, and determining feature amounts in said selected feature points as feature amounts with respect to said input image, wherein the predetermined number depends upon a resource of the image processing apparatus but does not depend upon said input image.

16. A non-transitory computer-readable storage medium storing a program which is read and executed by a computer, for causing said computer to execute the respective steps in the method according to claim 15.

* * * * *